United States Patent Office 2,838,561
Patented June 10, 1958

2,838,561
PRODUCTION OF POLYOLEFINIC ACYLOXY COMPOUNDS

Gene J. Fisher and Alexander F. MacLean, Corpus Christi, Tex., assignors to Celanese Corporation of America, New York, N. Y., a corporation of Delaware No Drawing. Application June 10, 1955
Serial No. 514,762

11 Claims. (Cl. 260—484)

This invention relates to the preparation of unsaturated compounds and relates more particularly to the production of polyolefinic acyloxy compounds.

It is an object of this invention to provide a novel process for the production of polyolefinic acyloxy compounds.

A further object of this invention is the provision of a new process for the production of sorbyloxy compounds, such as sorbic acid, sodium sorbate or other sorbate salts, and sorbate esters such as methyl sorbate.

Still another object of this invention is to provide a method of making novel precursors of sorbic acid by the reaction of ketene and a 1,1,3-trialkoxybutane.

Other objects of this invention will be apparent from the following detailed description and claims. In the description and claims all proportions are by weight unless otherwise indicated.

In accordance with one aspect of this invention a ketene is reacted with an alkoxyacetal and the resulting product is dealcoholated to produce a compound containing a polyolefinic acyloxy radical. Very good results have been obtained by the use of ketene, per se, in the reaction. However, other ketenes may be employed, such as ketenes of the general formula

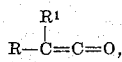

where R and R¹ are alkyl (e. g. methyl, ethyl, propyl), aryl (e. g. phenyl, tolyl, xylyl) or hydrogen, and R and R¹ may be the same or different.

The alkoxy acetals used in the practice of this invention are acetals of aliphatic alcohols and alkoxy aldehydes. They therefore contain at least three alkoxy groups two of which may be considered as derived from the aforesaid aliphatic alcohols and the remainder as derived from the alkoxy substituent of the aldehyde. Preferably, these alkoxy groups are lower alkoxy, e. g. methoxy, ethoxy, propoxy or butoxy, although higher alkoxy groups, e. g. lauroxy, may be present if desired. The alkoxy groups of the acetal employed may all be the same, or there may be employed a mixed alkoxyacetal, for example, 1.3-dimethoxy-1-ethoxybutane or 1,3,5-triethoxy-1-methoxyhexane. Outstanding results have been obtained with 1,1,3-trimethoxybutane. Example of other alkoxyacetals which may be used are 1,1,3-trimethoxyhexane, 1,1,3,5-tetramethoxyhexane, 1,1,3,5,7-pentamethoxyoctane and other polyalkoxyalkanes having two alkoxy groups attached to the same carbon atoms and at least one other alkoxy group attached to another carbon atom.

It is preferable, of course, that both the ketene and the alkoxyacetal be free of groups which would interfere with the reaction.

For best results the reaction between the ketene and the alkoxyacetal is carried out in the presence of an acid catalyst, such as a Friedel-Crafts type of catalyst, e. g. boron trifluoride, as such or in the form of a complex such as the etherate, ferric chloride or aluminum chloride. Other suitable acid catalysts are sulfuric acid, phosphoric acid or p-toluene sulfonic acid. The temperature of the reaction is desirably in the range of about −100 to +150° C., optimum results being obtained at about 0 to 25° C. The proportion of catalyst used depends, of course, on the particular catalyst and the temperature of reaction. Thus, at 0 to 25° C. about 0.5 to 2 parts of boron trifluoride, per 100 parts by weight of alkoxyacetal, are suitable.

It is advantageous to carry out the reaction in the presence of a solvent. This solvent may comprise merely an excess of the alkoxy acetal or it may comprise a solvent which is inert under the reaction conditions such as diethyl ether, carbon tetrachloride or hexane.

The reaction generally takes place at the acetal group of the alkoxyacetal and usually involves one molecule of the ketene for each reacting acetal group. However, the proportions of the reactants supplied to the reaction mixture may be varied as desired, although it is advantageous to use an excess of the alkoxy acetal over the equimolecular proportions.

The time of contact between the ketene and the alkoxyacetal and the manner in which they are brought into contact may be varied as desired although it is preferred to maintain these reactants together for a time sufficient to bring about nearly complete solution of the ketene in the reaction medium, e. g. 3 minutes or more. The ketene may be bubbled or diffused into and through a liquid body of the alkoxyacetal. The reaction may be carried out continuously, the reactants being mixed in countercurrent or cocurrent fashion. It has been found that higher yields are obtained by a cocurrent operation which minimizes the contact between the ketene and the ketene-alkoxyacetal reaction product. In one convenient method a stream of ketene gas, which may contain an inert diluent such as nitrogen, is fed continuously into a cooled liquid stream of the alkoxyacetal and the catalyst, and the resulting mixture of liquid and gas is passed continuously through an appropriate reactor, which may comprise a packed column. The portion of the ketene which has not reacted is allowed to separate, in the form of a stream of dilute ketene gas, from the mixture leaving the reactor and this stream is passed countercurrent through the fresh stream of alkoxyacetal and catalyst being supplied to said reactor. The liquid mixture leaving the reactor is desirably treated, as with a basic material, to neutralize or deactivate the catalyst, and the reaction product of the ketene and the alkoxyacetal is separated, as by distillation, from the unreacted alkoxyacetal.

The reaction product of the ketene and the alkoxyacetal generally contains an alkoxy ester having a plurality of alkoxy groups. There may also be present, among other materials, an ester of an unsaturated alkoxy acid containing one less alkoxy group than the aforesaid alkoxy ester. For example, when ketene is reacted with 1,1,3-trimethoxybutane there are obtained, after neutralization of the catalyst and distillation, three reaction products, namely, methyl 3,5-dimethoxyhexanoate, which is the major reaction product, methyl 5-methoxy-2-hexenoate and another compound which is converted on dealcoholation to a sorbyloxy compound.

The products produced by the reaction of the ketene and the alkoxyacetal may be dealcoholated in any desired manner. The several products may be separated by distillation and individually dealcoholated, or the mixture of products may be dealcoholated together. Preferably, the dealcoholation, which may include hydrolysis of the ester linkage in the products, is carried out in alkaline medium. Thus, the esters obtained as products of the reaction between the ketene and the alkoxyacetal may be heated with aqueous caustic soda solution, which causes the hydrolysis of the ester linkage followed by removal of the alkoxy groups attached to non-carbonyl carbon atoms. For example, when the products of the reaction of ketene and 1,1,3-trimethoxybutane, previously described, are heated with aqueous sodium hydroxide there is obtained an aqueous solution of sodium sorbate. On acidification of this solution sorbic acid is precipitated out. The same procedure may be employed with reaction products of ketene and other polyalkoxyalkanes having two alkoxy groups on the same carbon atoms and at least one alkoxy group on another carbon atom. Thus, there may be obtained from ketene and 1,1,3-trimethoxyhexane a product which on dealcoholation yields 2,4-octadienoic acid, while starting from 1,1,3,5-tetramethoxyhexane there may be obtained 2,4,6-octatrienoic acid.

In the dealcoholation under alkaline conditions it is found that better yields of the polyolefinic acid, e. g. sorbic acid, are obtained by removing the dealcoholation product, that is, the salt of the polyolefinic acid, from the reaction mixture and then recycling the alkaline medium by reacting it with further quantities of the material to be dealcoholated, preferably in the presence of added proportions of fresh alkaline medium. Also, it is found that when the alkaline medium is sodium hydroxide, the yield of the polyolefinic acid is improved when the dealcoholation temperature is below about 110° C., preferably below about 105° C., and the mole ratio of the sodium hydroxide to the material to be dealcoholated is relatively high, e. g. above 5:1.

The following examples are given to illustrate this invention further.

Example I

A stream of diluted ketene containing 1 to 2% (by volume) of nitrogen is fed continuously into admixture with a stream containing a mixture of 1,1,3-trimethoxybutane and boron trifluoride etherate ($BF_3 \cdot C_2H_5OC_2H_5$), the boron trifluoride content of said stream being 1%. The rates of feed are such that 2.58 moles of 1,1,3-trimethoxybutane, are supplied per mole of ketene. The resulting mixture of gas and liquid is maintained at a temperature of 9 to 10° C. while it is passed continuously first through a spiral condenser and then through a packed column, the duration of contact between gas and liquid being about three minutes. The unreacted gaseous portion of the mixture is then drawn off continuously. To more fully utilize its ketene content, this gaseous portion is recycled continuously into countercurrent contact with the previously described feed stream containing 1,1,3-trimethoxybutane before the latter is mixed with the fresh ketene-nitrogen stream described above. The liquid reaction product remaining after the withdrawal of said unreacted gaseous portion is treated with an equivalent amount of a 20% solution of sodium methoxide in methanol to neutralize the boron fluoride catalyst, and then flash distilled to evaporate off the unreacted 1,1,3-trimethoxybutane. Further distillation, at a subatmospheric pressure of 11 to 12 mm. Hg absolute, yields three successive fractions comprising, respectively, methyl 5-methoxy-2-hexenoate; a compound of undetermined constitution; and methyl 3,5-dimethoxyhexanoate. The methyl 5-methoxy-2-hexenoate has the following properties: Sp. gr.$_4^{20}$ 0.9702, $n_D^{20}$ 1.4300, boiling point at 20 mm. Hg absolute 85° C. The methyl 3,5-dimethoxyhexanoate has the following properties sp. gr.$_4^{20}$ 0.9986, $n_D^{20}$ 1,4238, boiling point at 20 mm. Hg absolute 110° C. The material of undetermined constitution has the properties: sp. gr.$_4^{20}$ 1.0208, $n_D^{20}$ 1,4091, boiling point at 8.9 mm. Hg absolute 81° C., saponification equivalent 165, carbon content 54.1%, hydrogen content 8.6% molecular weight (cryoscopically determined) 152, no hydroxy groups.

Example II

A mixture of 1 mole of the methyl 3,5-dimethoxyhexanoate obtained in Example I, 2.4 moles of sodium hydroxide and 30 moles of water is heated in a stainless steel autoclave for 4.1 hours at a temperature of 143 to 149° C. The methanol produced by the reaction is then distilled from the resulting reaction mixture and the mixture is thereafter acidified by the addition of 2.4 moles of sulfuric acid and cooled to a temperature of 5 to 10° C. The resulting precipitate comprising sorbic acid is filtered off, washed with cold water, and recrystallized from benzene. The yield of sorbic acid is 58%, based on the methyl 3,5-dimethoxyhexanoate used.

Example III

Example II is repeated except that the methyl 5-methoxy-2-hexenoate obtained in Example I is substituted for the methyl 3,5-dimethoxyhexanoate. Sorbic acid is obtained.

Example IV

Example I is repeated except that after the reaction mixture is distilled to remove the unreacted 1,1,3-trimethoxybutane the residue is not separated into three fractions. Instead 35 parts of this residue is heated with 32 parts of sodium hydroxide and 108 parts of water in a stainless steel autoclave for 1.8 hours at a temperature of 135 to 145° C. The resulting mixture is then distilled to remove methanol, acidified and cooled to recover sorbic acid, all as set forth in Example II.

Example V

Example II is repeated except that the amount of sodium hydroxide is 7.2 moles, the reaction temperature is 90 to 96° C. and the reaction time is 16.1 hours.

Example VI 38 parts of the methyl 3,5-dimethoxyhexanoate obtained in Example I are heated with 38 parts of sodium hydroxide and 108 parts of water for 5.5 hours under reflux, the temperature being about 95 to 106° C. The reaction mixture is then cooled, a small amount of methanol is added, and the mixture is filtered to remove sodium sorbate. The filtrate is then heated to remove methanol by distillation and another 38 parts of methyl 3,5-dimethoxyhexanoate is added together with fresh sodium hydroxide to increase the concentration thereof to that present before the aforesaid refluxing. The resulting mixture is then subjected to refluxing, cooling, filtration and heating in a manner identical with that described above. The process is repeated continuously. The filter cakes of sodium sorbate are washed with methanol, then dissolved in water, filtered, acidified and cooled to a temperature of 5 to 10° C. The resulting precipitate is sorbic acid, which is recovered by filtration, then recrystallized. The yield of sorbic acid is 85%.

It is to be understood that the foregoing detailed description is given merely by way of illustration and that many variations may be made therein without departing from the spirit of our invention.

Having described our invention what we desire to secure by Letters Patent is:

1. Process for the production of polyolefinic acyloxy compounds which comprises reacting a poly (lower alkoxy) alkane wherein two lower alkoxy radicals are on the 1-carbon atom and a further lower alkoxy radical is on the 3-carbon atom, the alkane portion having up to 8 carbon atoms, with a ketene and dealcoholating the product of the reaction to produce a polyolefinic acyloxy compound.

2. Process for the production of polyolefinic acyloxy compounds which comprises reacting a poly (lower alkoxy) alkane wherein two lower alkoxy radicals are on the 1-carbon atom and a further lower alkoxy radical is on the 3-carbon atom, the alkane portion having up to 8 carbon atoms, with ketene and dealcoholating the product of the reaction to produce a polyolefinic acyloxy compound.

3. Process for the production of polyolefinic acyloxy compounds which comprises reacting a poly (lower alkoxy) alkane wherein two lower alkoxy radicals are on the 1-carbon atom and a further lower alkoxy radical is on the 3-carbon atom, the alkane portion having up to 8 carbon atoms, with ketene in the presence of an acid catalyst to produce esters of lower alkoxy acids containing at least one lower alkoxy group and containing, exclusive of lower alkoxy groups, two more carbon atoms directly linked together than said poly (lower alkoxy) alkane, and dealcoholating said esters of lower alkoxy acids to produce a polyolefinic acyloxy compound.

4. Process which comprises reacting ketene and a 1,1,3-tri (lower alkoxy) butane and dealcoholating the product obtained to produce a sorbyloxy compound.

5. Process which comprises reacting ketene and a 1,1,3-tri (lower alkoxy) butane to produce esters of alkoxy acids having 6 carbon atoms linked directly together and dealcoholating said esters to produce a sorbyloxy compound.

6. Process which comprises reacting ketene and a poly (lower alkoxy) alkane wherein two lower alkoxy radicals are on the 1-carbon atom and a further lower alkoxy radical is on the 3-carbon atom, the alkane portion having up to 8 carbon atoms, to produce an ester of an alkoxy acid, and dealcoholating said ester in the presence of excess aqueous sodium hydroxide at a temperature below about 110° C. to produce a sorbyloxy compound.

7. Process which comprises reacting ketene and a 1,1,3-tri(lower alkoxy)butane to produce an alkoxy acid ester, dealcoholating said ester in the presence of excess sodium hydroxide at a temperature below about 110° C. to produce an alcohol and a precipitate of sodium sorbate, filtering off said precipitate from the reaction medium, distilling off said alcohol from said reaction medium and thereafter mixing said reaction medium with further quantities of sodium hydroxide and of said ester and heating to dealcoholate said ester.

8. Process for the dealcoholation of an alkyl 3,5-dialkoxyhexanoate to produce a sorbic acid salt, which comprises entering a lower alkyl 3,5-di(lower alkoxy)hexanoate and an aqueous alkaline liquid medium into a reaction zone, dealcoholating said alkyl 3,5-dialkoxyhexanoate in a liquid phase at an elevated temperature in said zone to produce an alcohol and a precipitate of a sorbic acid salt, separating said precipitate from the remaining alkaline liquid, distilling off said alcohol from said liquid, and returning the resulting liquid to said reaction zone together with further quantities of said alkyl 3,5-dialkoxyhexanoate.

9. Process as set forth in claim 8 in which said alkaline medium comprises sodium hydroxide.

10. Process as set forth in claim 9 in which in said reaction zone the mole ratio of sodium hydroxide to said alkyl 3,5-dialkoxyhexanoate is above 5:1 and the temperature is below about 105° C.

11. Process as set forth in claim 10 in which said alkyl 3,5-dialkoxyhexanoate is supplied to said reaction zone in the form of a mixture of reaction products obtained by the reaction of ketene and 1,1,3-trimethoxybutane.

References Cited in the file of this patent

UNITED STATES PATENTS

| | | |
|---|---|---|
| 2,436,286 | Brooks | Feb. 17, 1948 |
| 2,449,447 | Brooks | Sept. 14, 1948 |
| 2,457,225 | Gresham | Dec. 28, 1948 |
| 2,484,067 | Boese | Oct. 11, 1949 |
| 2,531,512 | Hoaglin et al. | Nov. 28, 1950 |